(12) United States Patent
Bracher et al.

(10) Patent No.: US 9,361,467 B2
(45) Date of Patent: Jun. 7, 2016

(54) OWNER-CONTROLLED ACCESS CONTROL TO RELEASED DATA

(75) Inventors: Shane Bracher, New Farm (AU); Padmanabhan Krishnan, Varsity Lakes (AU)

(73) Assignee: SAP SE, Walldorf (DE)

( * ) Notice: Subject to any disclaimer, the term of this patent is extended or adjusted under 35 U.S.C. 154(b) by 975 days.

(21) Appl. No.: 13/408,267

(22) Filed: Feb. 29, 2012

(65) Prior Publication Data

US 2013/0227285 A1    Aug. 29, 2013

(51) Int. Cl.
*H04L 9/32*         (2006.01)
*G06F 21/62*        (2013.01)

(52) U.S. Cl.
CPC ............ *G06F 21/62* (2013.01); *G06F 21/6218* (2013.01)

(58) Field of Classification Search
None
See application file for complete search history.

(56) References Cited

U.S. PATENT DOCUMENTS

2003/0217264 A1*   11/2003   Martin et al. ............... 713/156
2005/0033777 A1*    2/2005   Moraes et al. .............. 707/202
2005/0235148 A1*   10/2005   Scheidt et al. ............. 713/168

OTHER PUBLICATIONS

Ardissono, L. et al., "SynCFr: Synchronization Collaboration Framework," Fourth International Conference on Internet and Web Applications and Services (ICIW), May 24-28, 2009, Venice/Mestre, Italy, pp. 18-23.

Biennier, F. et al., "Collaborative business and data privacy: Toward a cyber-control?," Computers in Industry, vol. 56, Issue 4, May 2005, pp. 361-370.

Bracher, S., "Secure information flow for inter-organisational collaborative environments," Bond University, Apr. 2009, 150 pages.

Crampton, J., "A reference monitor for workflow systems with constrained task execution," SACMAT '05: Proceedings of the Tenth ACM Symposium on Access Control Models and Technologies, Stockholm, Sweden, Jun. 1-3, 2005, pp. 38-47.

DOM, "Document object model (DOM)," World Wide Web Consortium (W3C), Jan. 2005, Retrieved from <http://www.w3.org/DOM/>, 3 pages.

Graubart, R., "On the need for a third form of access control," Proceedings of the $12^{th}$ National Computing Security Conference, Oct. 1989, pp. 296-303.

Hadaya, P. et al., "Determinants of manufacturing firms' intent to use web based systems to share inventory information with their key suppliers," International Journal of e-Collaboration (IJeC), vol. 4, Issue 2, 2008, pp. 29-54.

(Continued)

*Primary Examiner* — Azizul Choudhury
(74) *Attorney, Agent, or Firm* — Fish & Richardson P.C.

(57) ABSTRACT

Implementations of the present disclosure include methods, systems, and computer-readable storage mediums for receiving, from a computing device used by an authenticated user, a validation request, the validation request including a first hash value and a first validation token, the first hash value being generated based on restricted content of a workflow object and the first validation token being associated with a first state of the workflow object, and determining that the authenticated user is authorized to request validation of the workflow object and, in response: decrypting the validation token to provide a second hash value, and determining that the second hash value is equal to both the first hash value and a third hash value and, in response, transmitting a validation response to the computing device, the validation response indicating that the workflow object is valid.

19 Claims, 7 Drawing Sheets

(56) References Cited

OTHER PUBLICATIONS

Hafner, M. et al., "A security architecture for inter-organizational workflows: Putting security standards for web services together," ICEIS '05: Proceedings of the 7th International Conference on Enterprise Information Systems, Miami, Florida, May 25-28, 2005, pp. 128-135.

Harrington, A. et al., "Cryptographic access control in a distributed file system," SACMAT '03: Proceedings of the 8th ACM Symposium on Access Control Models and Technologies, Villa Gallia, Como, Italy, Jun. 2-4, 2003, pp. 158-165.

Kang, M. et al., "Access control mechanisms for inter-organizational workflow," SACMAT '01: Proceedings of the 6th ACM Symposium on Access Control Models and Technologies, Chantilly, Virginia, May 3-4, 2001, pp. 66-74.

Knoepfel, A. et al., "Fundamental modeling concepts: Effective communication of IT systems," John Wiley & Sons, Ltd, Apr. 2006, Chichester, UK.

Koshutanski, H. et al., "An access control framework for business processes for web services," XMLSEC '03: Proceedings of the 2003 ACM Workshop on XML Security, Fairfax, Virginia, Oct. 31, 2003, pp. 15-24.

Kraft, R. "Designing a distributed access control processor for network services on the web," XMLSEC '02: Proceedings of the 2002 ACM Workshop on XML Security, Nov. 22, 2002, Fairfax, VA, pp. 36-52.

Miklau, G. et al., "Controlling Access to Published Data Using Cryptography," VLDB '03: Proceedings of the 29th International Conference on very Large Data Bases, Berlin, Germany, Sep. 9-12, 2003, pp. 898-909.

NEHTA, NEHTA industry seminar (discharge summary: The information—sample discharge summary) Retrieved from http://www.nehta.gov.au/index.php?option=com_docman&task=doc_details&gid=309&Itemid=139&catid=150, Jun. 2007, 6 pages.

Noor, A., "Securing the Core with an Enterprise Key Management Infrastructure (EKMI)," IDtrust '08: Proceedings of the 7th Symposium on Identity and Trust on the Internet, Mar. 4-6, 2008, Gaithersburg, Maryland, pp. 98-111.

Park, J. et al., "Originator Control in Usage Control," Proceedings of the 3$^{rd}$ International Workshop on Policies for Distributed Systems and Networks (POLICY'02), Jun. 5-7, 2002, pp. 60-66.

Park, J. et al., "Towards usage control models: Beyond traditional access control," SACMAT '02: Proceedings of the 7th ACM Symposium on Access Control Models and Technologies, Monterey, California, Jun. 3-4, 2002, pp. 57-64.

OASIS, Assertions and Protocols for the OASIS Security Assertion Markup Language (SAML) V2.0, retrieved from http://www.oasisopen.org/committees/tc_home.php?wg_abbrev=security#saml, Mar. 15, 2005, 86 pages.

Schroth, C. et al., "Reference architecture for cross-company electronic collaboration," International Journal of e-Collaboration (IJeC), vol. 5, Issue 2, 2009, pp. 75-91.

Vimercati, S. D. C. d., et al., "A data outsourcing architecture combining cryptography and access control," CSAW '07: Proceedings of the 2007 ACM Workshop on Computer Security Architecture, Fairfax, Virginia, Nov. 2, 2007, pp. 63-69.

Warner, J. et al., "Inter-instance authorization constraints for secure workflow management," SACMAT '06: Proceedings of the Eleventh ACM Symposium on Access Control Models and Technologies, Lake Tahoe, California, Jun. 7-9, 2006, pp. 190-199.

XACML, "eXtensible access control markup language (XACML)," Feb. 2005, Retrieved from <http://www.oasis-open.org/committees/tc_home.php?wg_abbrev=xacml>, 6 pages.

Zrelli, S. et al., "Improving kerberos security system for cross-realm collaborative interactions: An innovative example of knowledge technology for evolving & verifiable E-society," International Conference on Research, Innovation and Vision for the Future, Mar. 5-9, 2007, Hanoi, Vietnam, pp. 211-219.

Bracher, S., Krishnan, P., "Supporting Secure Information Flow: An Engineering Approach," International Journal of e-Collaboration (IJeC), vol. 8, Issue 1, 2012, pp. 17-35.

Edwards, J., "Cross-Domain Office Aims for Secure Data Sharing," Defense Systems, Jul. 28, 2011, 2 pages.

Harris, D. et al., "Standards for Secure Data Sharing Across Organizations," Computer Standards & Interfaces, vol. 29 Issue 1, Jan. 2007, pp. 86-96.

* cited by examiner

OWNER-CONTROLLED ACCESS CONTROL TO RELEASED DATA

BACKGROUND

As entities or organizations digitally collaborate (e.g., during business-to-business (B2B) activities over the Internet), ever-increasing amounts of data is accessed and shared across networks spanning multiple administrative domains and organizational boundaries. Such collaborative environments can pose security concerns. For instance, risks to data confidentiality, data privacy and threats to improper data usage can be of concern. In collaborative environments, organizations share sensitive information with other collaborators in a business setting. In such environments, collaboration is essential and privacy of data can be critical.

In view of this, the shift toward a distributed application paradigm has inspired a fundamental re-evaluation of information security and in particular, access control. One aspect of interest is loss of control over shared information. For example, when data is released from one domain to another domain, the data owner relinquishes all control over the data. For example, the data can be downloaded, copied, disseminated, and/or redistributed.

SUMMARY

Implementations of the present disclosure provide computer-implemented methods including actions of receiving, from a computing device used by an authenticated user, a validation request, the validation request comprising a first hash value and a first validation token, the first hash value being generated based on restricted content of a workflow object and the first validation token being associated with a first state of the workflow object, and determining that the authenticated user is authorized to request validation of the workflow object and, in response: decrypting the validation token to provide a second hash value; and determining that the second hash value is equal to both the first hash value and a third hash value and, in response, transmitting a validation response to the computing device, the validation response indicating that the workflow object is valid.

In some implementations, determining that the authenticated user is authorized to request validation of the workflow object includes checking a validation policy.

In some implementations, decrypting the validation token to provide the second hash value is achieved using a master key associated with the workflow object.

In some implementations, a validation agent that is executed using the one or more processors receives the validation request and determines that the authenticated user is authorized to request validation of the workflow object.

In some implementations, the validation agent transmits the validation response to a trusted agent that is executed on the computing device.

In some implementations, actions further include receiving an access key request from the computing device, and determining, based on one or more access control policies (ACPs) and information provided in the access key request, that the authenticated user is authorized to access one or more data items of the restricted content and, in response: identifying a set of permitted operations including one or more operations that the authenticated user is permitted to perform on the one or more data items; retrieving, from computer-readable memory, one or more access keys that are usable to access the one or more data items; and transmitting an access key response to the computing device, the access key response including the set of permitted operations and the one or more access keys.

In some implementations, the information provided in the access key request includes one or more data item identifiers, each data item identifier corresponding to a data item of the one or more data items.

In some implementations, identifying a set of permitted operations includes identifying a permitted operation from the one or more ACPs based on a data item identifier and adding the permitted operation to the set of permitted operations.

In some implementations, identifying the permitted operation is further based on an identity of the authenticated user.

In some implementations, an access control agent that is executed using the one or more processors receives the access request and determines that the authenticated user is authorized to access the one or more data items.

In some implementations, the access control agent transmits the access key response to a trusted agent that is executed on the computing device.

In some implementations, actions further include receiving a validation token request, the validation token request including a third hash value, the third hash value being generated based on the restricted content; recording the third hash value in a state change log, the third hash value corresponding to a second state of the workflow object, the state change log being stored in computer-readable memory; generating, using the one or more processors, a second validation token based on the third hash value; and transmitting a validation token response to the computing device used by the authenticated user, the validation token response including the second validation token.

In some implementations, the second validation token is generated based on the third hash value and a master key associated with the workflow object.

In some implementations, the third hash value is generated based on the restricted content associated with the workflow object.

In some implementations, the computing device replaces the first validation token with the second validation token.

In some implementations, prior to transmitting the validation token request, the computing device: determines that changes to a working copy of the workflow object conform to one or more permitted operations; commits the changes to a persistent copy of the workflow object; calculates the third hash value; and generates the validation token request.

In some implementations, a trusted agent that is executed on the computing device determines that the changes conform to the one or more permitted operations, commits the changes, calculates the third hash value, and generates the validation token request.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to enabling access control to data that is transferred across organizational boundaries. More particularly, implementations of the present disclosure provide a distributed access control enforcement approach for workflow objects using software agents and data encryption techniques. In some examples, a workflow can be provided as a plurality of tasks that are executed in a process. Example workflow objects can include a document assigned to a pre-defined workflow. In accordance with implementations of the present disclosure, access to restricted content within workflow objects can based on the possession of one or more encryption keys and can further be based on role enactment. In some examples, trusted software agents can be provided to verify and ensure the validity of the workflow object. Accordingly, implementations of the present disclosure provide a mechanism that enables interested parties to maintain control over their data as it flows from one domain to another. That is, implementations of the present disclosure enable an owner of a workflow object to maintain control over content, structure and/or flow path as the workflow object circulates through networks spanning multiple domains.

In some implementations, an abstract model is provided and can include that a set of agents (A), data items (D) and operations (O). The term action can refer to a data item, operation pair. For example, an action can be provided as an element of D×O. A policy can be provided as a set of triples and a subset of A×D×O. A policy indicates which agents are authorized to perform which actions. In some implementations, a policy is dynamic and can change from state to state. More particularly, a set of states (S) can be provided to denote the evolution of the system. In some implementations, a function (e.g., has) can identify the agent that currently has a subject data item based on a given state. In some examples, it can be assumed that only a single agent can have a data item at any one time. In some implementations, a function (e.g., policy) can provide an access control policy (ACP) that is active in the given state (i.e., state of the workflow object). In some examples, an ACP can be active for a given state and a given role of the agent seeking access to the workflow object. In some examples, and as discussed in further detail herein, each data item can include document data (d.data) and metadata (d.meta) associated therewith.

Based on the above-described information, the abstract model can define a validity of transition. By way of non-limiting example, a transition from a first state (s) to a second state (s') using an action (d, o) can be determined to be valid if the function [has(d, s), (d, o)] is an element of one or more active ACPs. In some examples, neither the ACP that is valid in the second state (s') nor which agent that currently has the data item are defined. In some examples, although the policy allows the operation (o) to be performed on the data item (d) by the agent who has access to the data item (d), the policy could also disallow other agents from performing the operation. In this manner, the data item can be protected to prevent incorrect operations.

The non-limiting example above (i.e., a transition from a first state (s) to a second state (s') using an action (d, o)) can be provided as a series of example steps:

Step 1: k=getAccess(has(d, s), d)
Step 2: $d_a$=open(k, d.data)
Step 3: d.data=perform(o, $d_a$)
Step 4: close(d)

Example Step 1 is directed to the agent obtaining an access control key (k) for the data item (d), example Step 2 is directed to unlocking the actual data part (d.data) of the data item (d), example Step 3 performs the actual operation (o) on the unlocked data item (d) and updates the data item (d), and example Step 4 closes the data item (d) from further operations being performed thereon.

Figure 1:
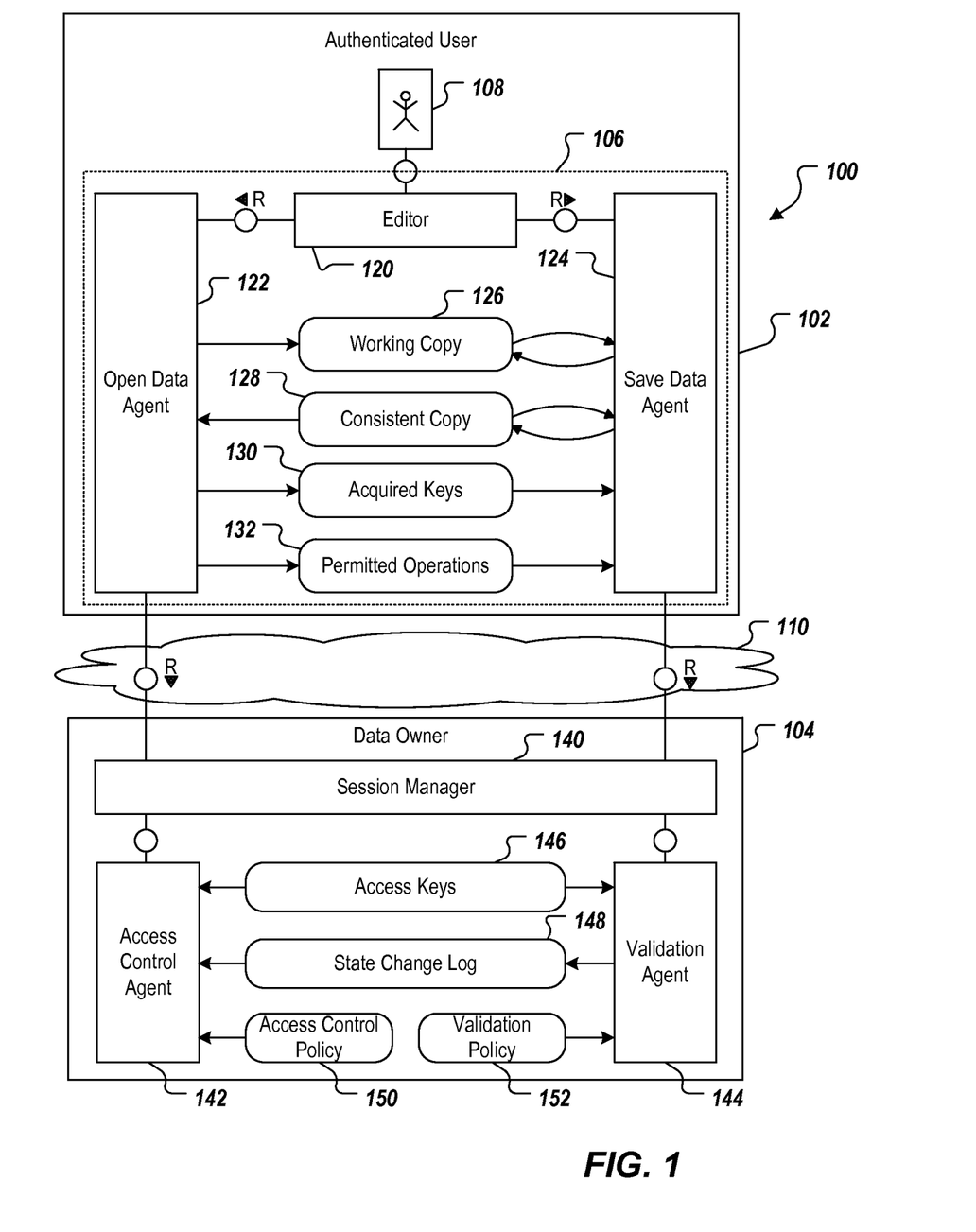
FIG. 1 depicts an example architecture in accordance with implementations of the present disclosure.

FIG. 1 depicts an example architecture 100 in accordance with implementations of the present disclosure. The example architecture 100 reflects a design model for enforcing access control constraints on a workflow object. In some examples, a workflow object refers to the data entity that can be transferred from one recipient to another. As discussed above, a workflow object can be implemented as a document.

The example architecture 100 includes an authenticated user 102 and a data owner 104. In some implementations, the authenticated user 102 and the data owner 104 can be considered agents that impact the workflow object. In some examples, the authenticated user 102 is the "recipient" currently possessing the workflow object, and the data owner 104 controls the ACPs imposed on the workflow object. It is appreciated that the authenticated user 102 of FIG. 1 can be representative of a plurality of authenticated users that can have access to the workflow object. The authenticated user(s) 102 connect to the data owner 104 to request access to content within the workflow object.

In some implementations, the authenticated user 102 can include a computing device 106 (e.g., a client computing device). In some examples, the authenticated user 102 can further include a human user 108 that interacts with the computing device 106. In some implementations, the data owner 104 can include a computing device (e.g., a server computing device) and can communicate with the authenticated user 102 over a network 110. The network 110 can be provided as a large computer network, such as a local area network (LAN), wide area network (WAN), the Internet, a cellular network, or a combination thereof connecting any number of clients, servers, and/or other computing systems.

In some implementations, the authenticated user 102 includes an editor 120, an open data agent (ODA) 122, a save data agent (SDA) 124, a working copy file 126, a consistent copy file 128, an acquired keys file 130 and a permitted operations file 132. In some examples, the editor 120, the ODA 122 and the SDA 124 can each be provided as one or more computer programs that are executable on the computing device 106. The ODA 122 and the SDA 124 are each provided as so-called trusted agents. That is, the ODA 122 and the SDA 124 are each trusted by the data owner 104 to uphold and enforce the ACPs imposed on a workflow object provided by the data owner 104 to the authenticated user 102. In some examples, the working copy file 126, the consistent copy file 128, the acquired keys file 130 and the permitted operations file 132 can be stored in computer-readable memory of the computing device 106.

In some examples, the editor 120 enables the authenticated user 102 to edit a document (i.e., a workflow object) provided by the data owner 104, and communicates with the ODA 122 and the SDA 124. The workflow object is received from the data owner 104 and a working copy of the workflow object is stored in the working copy file 126. The ODA 122 is invoked by the editor 120 when the authenticated user 102 opens the workflow object. The ODA 122 communicates with the data owner 104 to confirm that the workflow object is valid and to acquire any access keys that the authenticated user 102 requires to perform operations on the workflow object. The data owner 104 provides the access keys to the ODA and indicates the permitted operations associated with the access keys. The access keys are stored in the acquired keys file 130 and the permitted operations are stored in the permitted operations file 132. The ODA 122 is related to the concepts of the getAccess, has and open functions in the abstract model, discussed above.

The SDA 124 is invoked by the editor 120 when the authenticated user 102 saves changes to the workflow object. In some examples, the editor 120 is not trusted (i.e., the editor 120 is not trusted by the data owner 104 to uphold and enforce the ACPs imposed on the workflow object). Consequently, the SDA 124 checks changes submitted by the editor 120 against the permitted operations associated with the received access keys. If the changes to a working copy of the workflow object conform to the permitted operations, the SDA 124 updates a consistent copy of the workflow object accordingly. The consistent copy of the workflow object is stored in the consistent copy file 128. In some examples, the consistent copy is provided as a valid version of the workflow object. In some implementations, saving changes to the workflow object also requires revalidation so that the data owner 104 is aware of the changes to the workflow object, as discussed in further detail below. The SDA 124 is related to the concepts of the close action in the abstract model, discussed above.

In some implementations, the data owner 104 responsible for, among other activities, providing the workflow object to the authenticated user 102, validating the workflow object, updating validation tokens of the workflow object and authorizing access to the workflow object. In the depicted example, the data owner 104 includes a session manager 140, an access control agent (ACA) 142, a validation agent (VA) 144, an access keys file 146, a state change log file 148, an access control policy (ACP) file 150 and a validation policy file 152. In some examples, the session manager 140, the ACA 142 and the VA 144 can each be provided as one or more computer programs that are executable on the computing device. In some examples, the access keys file 146, the state change log file 148, the ACP file 150 and the validation policy file 152 can be stored in computer-readable memory of the computing device. In some examples, the session manager 140 handles communications between authenticated users (e.g., the authenticated user 140) and the data owner 104. In some examples, and depending on the nature of the request, the session manager 140 forwards incoming authenticated user requests to the ACA 142 (e.g., for access key requests) or to the VA 144 (e.g., for validation checks and updates). The ACA 140 and the VA 144 refer to their respective policies (i.e., the ACPs stored in the ACP file 150 and the validation policies stored in the validation policy file 152, respectively) to process the respective request.

One or more ACPs can be stored in the ACP file 150. In some examples, an ACP specifies access control constraints applied by the data owner 104 to the workflow object. In some examples, the ACP can be provided as an access control list with entries detailing operations (e.g., read only, modify, etc.) that specific subjects (e.g., authenticated users, roles) are either permitted or not permitted to perform on specified content within the workflow object. One or more validation policies can be stored in the validation policy file 152. In some examples, a validation policy identifies entities that are authorized to request validation checks on the workflow object. Example values provided in a validation policy can include: any (i.e., unrestricted as to who can request validation checks), none (i.e., no-one can request validation checks), acl (i.e., only those entities that are granted access privileges as defined in the ACP can request validation checks), custom-defined (i.e., the data owner 104 defines their own list of subjects who can request validation checks).

One or more access keys are stored in the access keys file 146. In some examples, access keys can be provided as symmetric encryption keys that are issued to authorized users (e.g., the authenticated user 102) on-demand, to enable access to content within the workflow object. In some examples, each workflow object is associated with a master key that can be provided as a symmetric encryption key that is known only to the data owner 104. In some examples, the access keys associated with a particular workflow object can be derived from the master key. In some implementations, validation tokens (i.e., used for validating the workflow object) can require the master key. For example, validation tokens can be used to implement the functions has and getAccess. A state change log can be stored in the state change log file 148. In some examples, the state change log records the change history of the workflow object from state-to-state. In some examples, the state change log records a timestamp, user ID (i.e., of the authenticated user who changed the workflow object) and a validation token (i.e., used by the data owner to determine the validity of the workflow object).

In some implementations, user authentication, user management and distribution of workflow objects can be considered. In some examples, such functions can be performed by the data owner and/or a trusted third party. In the case of user authentication and user management, and in some implementations, an identity management system can be employed with support for single sign-on (e.g., to avoid replicating user identities and to enable easier integration with existing authentication systems). In the case of distribution of workflow objects, workflow objects can be sent from the data owner to an authenticated user via email. In some examples, and for more complicated situations (e.g., where stricter workflow conditions are defined), distribution of the workflow object can be controlled by a document management system containing workflow support. Such document management systems can provide concurrency support (e.g., locking the workflow object to avoid simultaneous changes).

Figure 2:
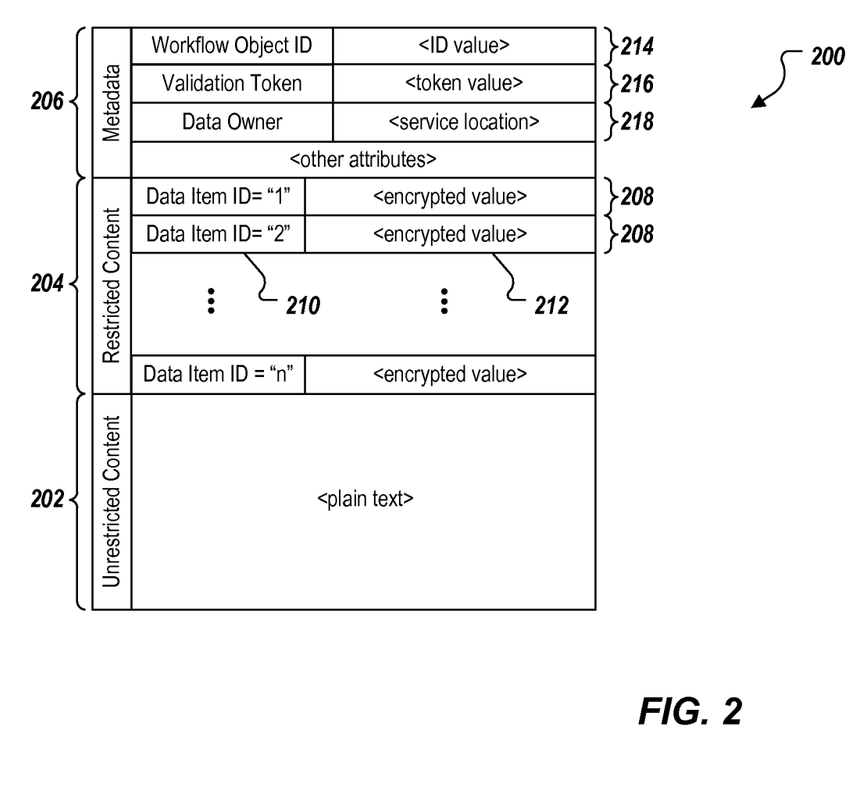
FIG. 2 depicts an example workflow object.

FIG. 2 depicts an example workflow object 200. In some examples, and although the workflow object 200 can be referred to as a single data entity, the workflow object 200 can include a plurality of components. In the depicted example, the workflow object 200 includes unrestricted content 202, restricted content 204 and metadata 206. Generally, document data includes content within the workflow object (e.g., both the unrestricted content 202 and the restricted content 204). In some examples, the unrestricted content 202 includes content not subject to any access control.

In some examples, the restricted content 204 includes content that is subject to access, and can be organized into data items 208 that are each uniquely identified within the workflow object 200. In some examples, a data item 208 can be provided as a data field 210 having a data value 212 assigned thereto (i.e., a name-value pair). In some examples, a data item can include other data items to provide a data hierarchy.

In some examples, the data items 208 can be individually protected such that fine-grained access control constraints can be applied. For example, data of the data items can be provided as encrypted data 212. In some examples, access to restricted content can be provided through the access keys provided to authorized users (e.g., the authenticated user 102 of FIG. 1). In some examples, the metadata 206 includes attributes within the workflow object 200 that can be required to achieve correct behavior, as specified in the abstract model. These attributes allow authorized recipients (e.g., the authenticated user 102 of FIG. 1) to acquire access keys and to validate the restricted content 204. In the depicted example, the metadata 206 include a workflow object identifier (ID) 214, a validation token 216 and a data owner identifier 218. In general, the metadata 206 provides cryptographic-related information relating to the restricted content 204 within the document data, and can include access key details, digital signatures and/or access permissions. Such information can be used by authenticated users to access the restricted content 206.

In some implementations, access control constraints are only applied to sensitive data of the workflow object 200 (e.g., the restricted content 204) such that any non-sensitive data (e.g., the unrestricted content 202) is unaffected. In this manner, a finer level of granularity is provided for, for example, collaborative situations where the workflow object 200 may have many recipients from different organizations. Further, this enables the workflow object 200 to be partitioned, such that recipients can only access those parts that they are authorized to access.

In general, the workflow object 200 include a document template and the document data and document metadata are designed to be machine interpretable (i.e., to support automated processing). The document template provides a user-friendly view of the workflow object, which can serve as an interface between the user (e.g., the human user 108) and the workflow object.

Implementations of the present disclosure provide a plurality of high-level processes. In some examples, the high-level processes include validating a workflow object, acquiring an access key and committing changes to a workflow object. Each of the example high-level processes is discussed in further detail below.

In some implementations, a workflow object is validated through execution of the validating a workflow object process. In some examples, when a workflow object (e.g., the workflow object 200) is opened by an authenticated user (e.g., the authenticated user 102), the ODA (e.g., the ODA 122) calculates a hash value for the restricted content (e.g., the restricted content 204) of the workflow object, and sends the hash value, together with a validation token (e.g., the validation token 214) as a request message to the data owner (e.g., the data owner 104). In some examples, the hash value is calculated based on processing the restricted content using a hash function (e.g., MD5, SHA-1, SHA-2, etc.). The request message is received by the session manager (e.g., the session manager 140) and forwarded to the VA (e.g., the VA 144) for processing.

In some examples, the VA checks the validation policy to determine whether the authenticated user is authorized to request the validation check. If the authenticated user is not authorized, an authorization denied response message is sent to the authenticated user and the process terminates. In some examples, and if the authenticated user is not authorized, the session manager blocks any further request messages from the authenticated user. If, however, the authenticated user is authorized to request the validation check, the VA decrypts the validation token (e.g., using the master key associated with the workflow object) to reveal a hash value. If the hash value does not match the most recent hash value contained in the state change log (for the particular workflow object) and the hash value received in the request message, the workflow object possessed by the authenticated user is determined to be invalid. Consequently, an invalid workflow object response message can be sent to the authenticated user and the process terminates. In some examples, and if the workflow object possessed by the authenticated user is determined to be invalid, the session manager only accepts further validation check requests from the authenticated user.

If the authenticated user is authorized to request the validation check and, if the hash value revealed from decrypting the validation token matches the most recent hash value contained in the state change log and the hash value received in the request message, a valid workflow object response message is sent to the authenticated user. Consequently, the session manager accepts new requests from the authenticated user (e.g., acquire access key and revalidation requests).

In some implementations, the authenticated user acquires one or more access keys through execution of the acquiring an access key process. In some examples, restricted content within a workflow object is accessed by the authenticated user by acquiring the access key from the data owner. For example, after the workflow object has been validated (e.g., using the validating a workflow object process, discussed above), the ODA can request access to data items within the restricted content section of the workflow object. To achieve this, an access key request message is sent from the ODA to the data owner. The access key request message is received by the session manager and is forwarded to the ACA for processing. In some implementations, the ACA checks the ACP to determine whether the authenticated user is authorized to access the data item(s) of the restricted content and, if so, to determine what type of access is permitted. If the authenticated user is authorized to access the data item(s) of the restricted content, the ACA provides the access key(s) to the ODA, together with a list of permitted operations that apply in a response message. The ODA receives the response message and uses the access key(s) to decrypt the corresponding data item(s) in the workflow object. The access key(s) and the list of permitted operations are made available to the SDA (e.g., through the acquired keys file 130 and the permitted operations file 132), such that the SDA can commit changes made by the authenticated user on the workflow object, as discussed in further detail below.

In some implementations, the authenticated user commits changes to the workflow object through execution of the committing changes to a workflow object process. For example, when the authenticated user modifies a workflow object using the editor, such modifications are actually made to a working copy of the workflow object (e.g., provided in the working copy file 126). The changes are only reflected in a consistent copy (e.g., provided in the consistent copy file 128) after the changes have been confirmed to conform to the ACP(s). In some implementations, when the authenticated user saves changes to the workflow object using the editor, the editor invokes the SDA to check any changes.

In some examples, the SDA compares the working copy with the consistent copy and checks that all changes adhere to the permitted operations. If all of the changes do not adhere to the permitted operations, the working copy is considered to be invalid, the consistent copy is left unchanged and the process terminates. If all of the changes adhere to the permitted operations, the SDA commits these changes to the consistent copy, and the state of the workflow object transitions (e.g., from a pre-change state to a post-change state). Because the workflow object has changed states, a new validation token is to be issued by the data owner. To achieve this, and in some examples, the SDA calculates the hash value for the restricted content section of the workflow object and sends the hash value to the data owner in a validation token request message. In some examples, the hash value is calculated based on processing the restricted content using a hash function (e.g., MD5, SHA-1, SHA-2, etc.). The validation token request message is received by the session manager and is forwarded to the VA for processing. In some examples, the VA creates a new validation token by encrypting the hash value using the master key associated with the workflow object, and creates a new entry in the state change log to record the hash value. The VA sends the validation token to the SDA in a response message, and the received validation token replaces the previous validation token contained in the metadata of the consistent copy of the workflow object.

Figure 3:
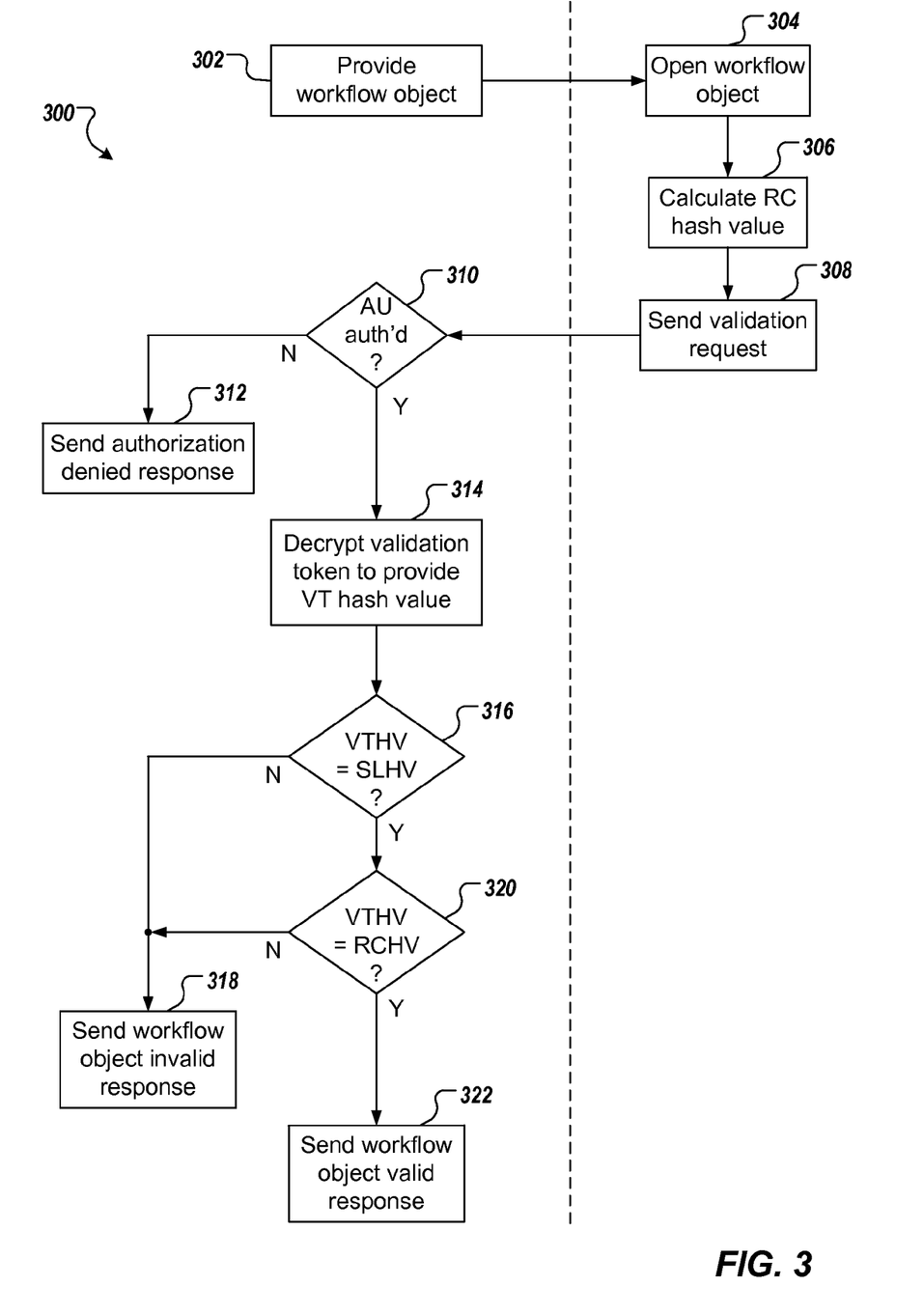
FIG. 3 is a flowchart depicting an example process that can be executed in accordance with implementations of the present disclosure.

FIG. 3 is a flowchart depicting an example process 300 that can be executed in accordance with implementations of the present disclosure. In some implementations, the example process 300 can be executed using one or more computer programs executed using one or more computing devices.

A workflow object is provided (302). In some examples, a data owner can provide the workflow object to an authenticated user (e.g., via email). In some examples, a data management system can provide the workflow object to the authenticated user. The workflow object is opened (304). For example, the authenticated user can open the workflow object using an editor program. A restricted content (RC) hash value is calculated (306). For example, an ODA that is executed using one or more processors can calculate the RC hash value (RCHV). A validation request is sent (308). In some examples, the validation request includes the RCHV and a validation token (e.g., provided from the workflow data object). In some examples, the validation request is sent to the data owner. In some examples, the validation request is sent to the data management system.

It is determined whether the authenticated user (AU) is authorized (310). For example, the request message is received by a session manager (e.g., at the data owner or the data management system) and is provided to a VA, which can determine whether the authenticated user is authorized to request the validation check. If the authenticated user is not authorized, an authorization denied response message is sent to the authenticated user (312) and the process terminates. In some examples, if the authenticated user is not authorized, the session manager blocks any further request messages from the authenticated user. If, however, the authenticated user is authorized to request the validation check, the validation token is decrypted to provide a validation token hash value (VTHV) (314). In some examples, the VA decrypts the validation token using a master key associated with the workflow object.

It is determined whether the VTHV is equal to a state change log hash value (SLHV) (316). In some example, the SLHV is provided as the most recent hash value contained in the state change log for the particular workflow object. If the VTHV is not equal to the SLHV, a workflow object invalid message is sent to the authenticated user (318) and the process terminates. In some examples, and if the workflow object possessed by the authenticated user is determined to be invalid, the session manager only accepts further validation check requests from the authenticated user. If the VTHV is equal to the SLHV, it is determined whether the VTHV is equal to the RCHV (320). If the VTHV is not equal to the RCHV, the workflow object invalid message is sent to the authenticated user (318) and the process terminates. If the VTHV is equal to the RCHV, a workflow object valid message is sent to the authenticated user (322). In some examples, the session manager accepts new requests from the authenticated user (e.g., acquire access key and revalidation requests).

Figure 4:
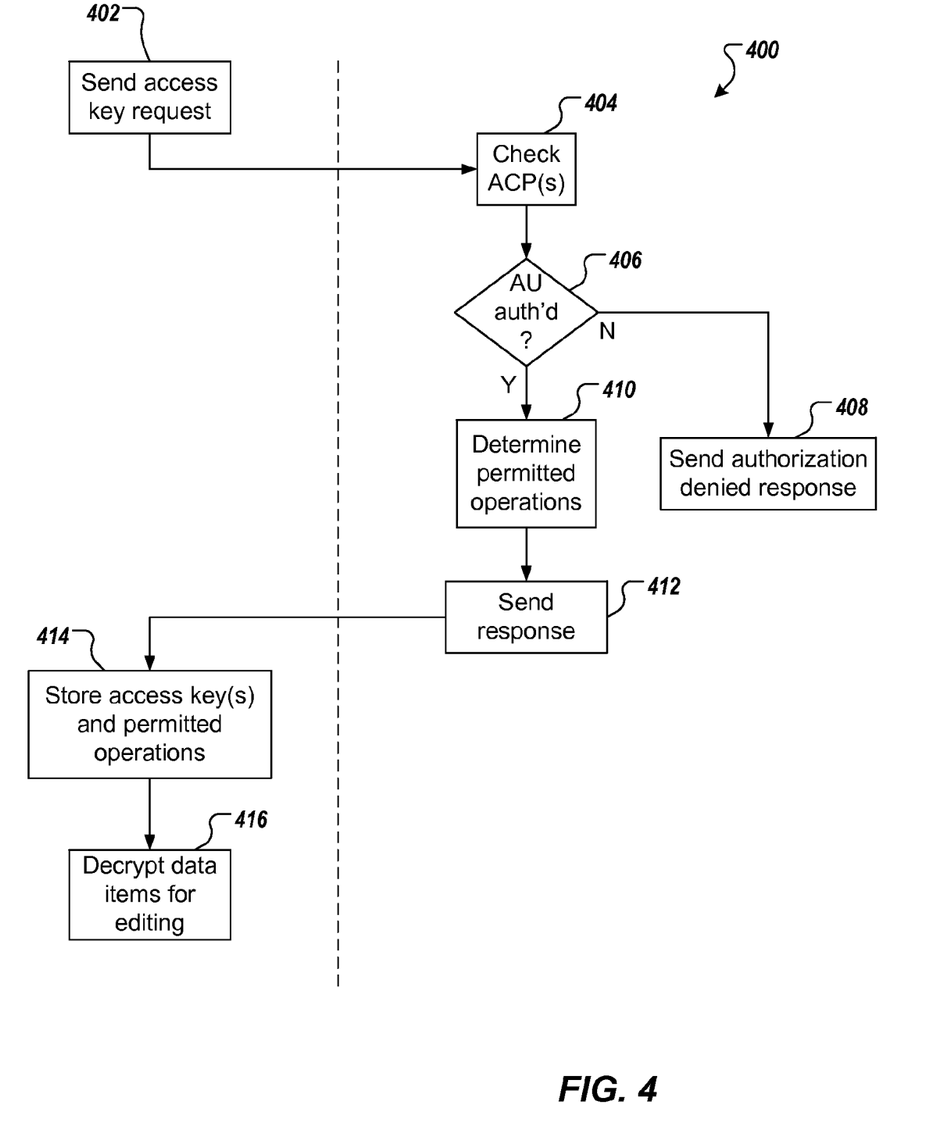
FIG. 4 is a flowchart depicting an example process that can be executed in accordance with implementations of the present disclosure.

FIG. 4 is a flowchart depicting an example process 400 that can be executed in accordance with implementations of the present disclosure. In some implementations, the example process 400 can be executed using one or more computer programs executed using one or more computing devices.

An access key request is sent (402). For example, after the workflow object has been validated, the ODA can request access to data items within the restricted content section of the workflow object. One or more ACPs are checked (404). For example, the access key request message is received by the session manager and is forwarded to the ACA, which checks the ACPs to determine whether the authenticated user is authorized to access the data item(s) of the restricted content. It is determined whether the AU is authorized to access the data item(s) (406). If the AU is not authorized to access the data item(s) based on the ACPs, an authorization denied response is sent (408).

If the AU is authorized to access the data item(s) based on the ACPs, the operations that are permitted to be performed on the data item(s) are determined (410). A response message is sent (412). For example, the ACA provides the access key(s) to the ODA, together with the permitted operations in the response message. The access key(s) and the permitted operations are stored (414). For example, the ODA receives the response message and stores the access key(s) and the permitted operations (e.g., in the acquired keys file and the permitted operations file). The data item(s) are decrypted for editing (416). For example, the ODA decrypts the corresponding data item(s) in the workflow object using the access key(s).

Figure 5:
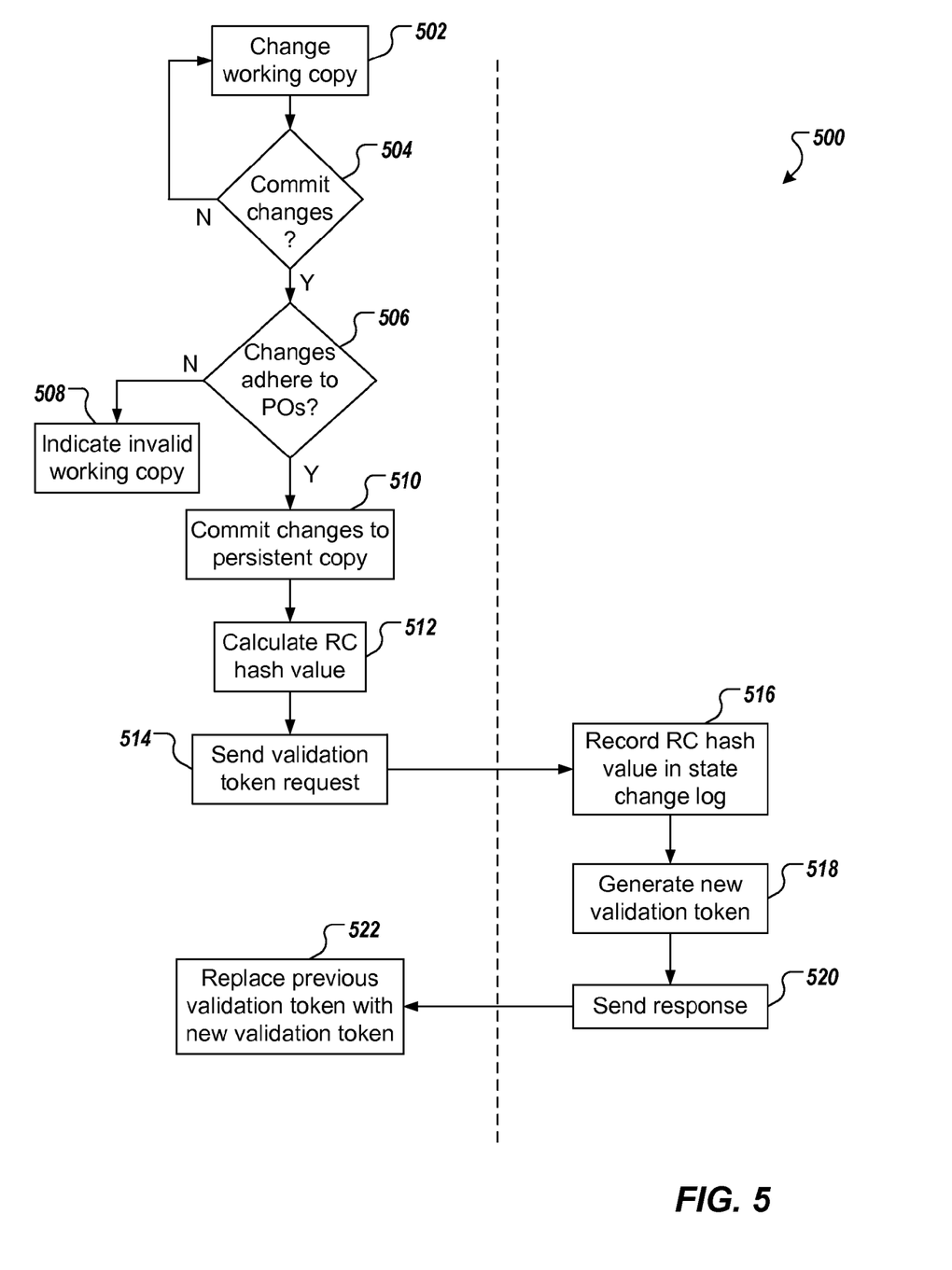
FIG. 5 is a flowchart depicting an example process that can be executed in accordance with implementations of the present disclosure.

FIG. 5 is a flowchart depicting an example process 500 that can be executed in accordance with implementations of the present disclosure. In some implementations, the example process 500 can be executed using one or more computer programs executed using one or more computing devices.

A working copy of the workflow object is changed (502). For example, changes to the working copy can be made using an editor. It is determined whether the changes to the working copy are to be committed (504). If the changes are not to be committed, the process loops back. If the changes are to be committed, it is determined whether the changes conform to the permitted operation(s) (POs) (506). For example, the SDA compares the working copy with a consistent copy and checks that all changes adhere to the permitted operations. If the changes do not conform to the permitted operations, an indication of an invalid working copy is provided (508) and the process terminates. In some examples, an indicator can be displayed by the editor. In some examples, if all of the changes do not adhere to the permitted operations, the working copy is considered to be invalid, the consistent copy is left unchanged and the process terminates.

If the changes do conform to the permitted operations, the changes are committed to the persistent copy (510). For example, if all of the changes adhere to the permitted operations, the SDA commits the changes to the consistent copy, and the state of the workflow object transitions (e.g., from a pre-change state to a post-change state). A restricted content hash value (RCHV) is calculated (512). For example, the SDA calculates the RC hash value. A validation token request is sent (514). For example, the SDA sends the RCHV to the data owner in the validation token request. The RCHV is recorded in the state change log (516). For example, the validation token request message is received by the session manager and is forwarded to the VA for processing. A new validation token is generated (518). For example, the VA creates the new validation token by encrypting the RCHV using the master key associated with the workflow object, and creates a new entry in the state change log to record the hash value. A response message is sent (520). For example, the VA sends the validation token to the SDA in the response message. The previous validation token is replaced with the new validation token (522). For example, the received validation token replaces the previous validation token contained in the metadata of the consistent copy of the workflow object.

Figure 6:
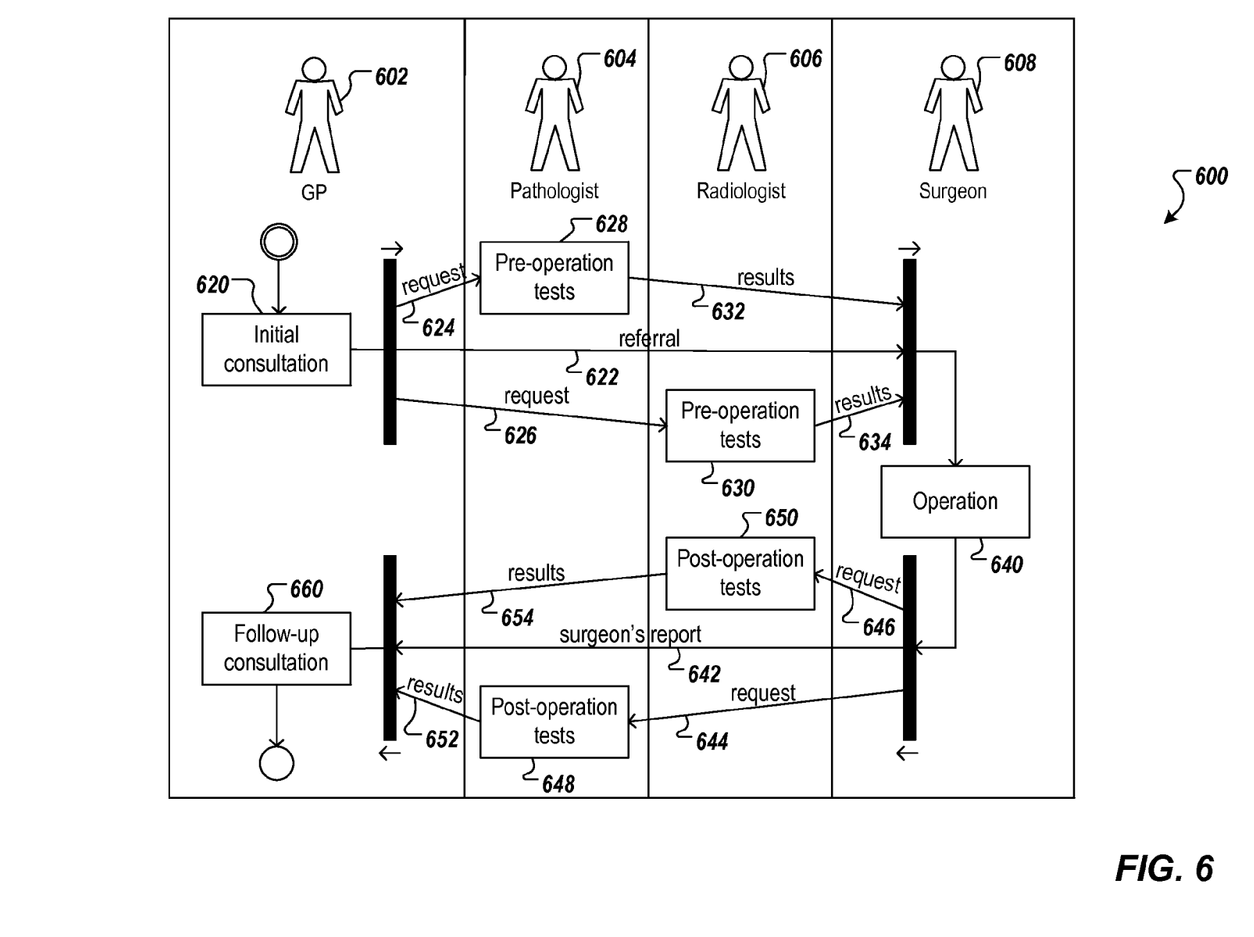
FIG. 6 depicts an example workflow scenario.

FIG. 6 depicts an example workflow scenario 600. The example workflow scenario 600 is provided to illustrate implementations of the present disclosure and is based on a non-limiting example that is directed to interoperable electronic health services and architectures. The example workflow scenario demonstrates distributed access control enforcement for documents assigned to workflows, adopts a concurrent workflow rather than a completely sequential workflow, and illustrates how constraints can be applied on role enactment. For example, one or more ACPs can specify conditions that are to be satisfied for an authenticated user to enact a particular role for a given workflow state. In some examples, such policies can be applicable to define separation of duty constraints.

In the example workflow scenario 600, a workflow object can be provided as an electronic health record (EHR) for a patient, the EHR being transferred between authenticated uses. Example authenticated users are provided as a general practitioner (GP) 602, a pathologist 604, a radiologist 606 and a surgeon 608. Throughout the workflow scenario 600, it can be assumed that an authority exists for storing and distributing the EHR to the authenticated users upon request. In some examples, each authenticated user can retrieve the EHR from an authority (e.g., a workflow engine), process the EHR in accordance with the workflow activity being conducted by the particular authenticated user, and can return the EHR to the authority.

In the depicted example, the patient visits the GP 602 for an initial consultation 620. A referral 622 to the surgeon 608, a pathology request 624 and a radiology request 626 are added to the patient's EHR by the GP 602. In some examples, the GP 602 can protect the referral 622 as read only for surgeons and as not accessible for others, and can provide pathology request 624 and the radiology request 646 as readable for all. Accordingly, this policy can be provided as an abstract policy function that is implemented as an access control policy (i.e., everyone can read) and a validation policy (i.e., no one change the data). The patient can visit the pathologist 604 and the radiologist 606 for pre-operation tests 628, 630, respectively. In some examples, the order in which the pre-operation tests 628, 630 are performed is irrelevant. Each of the pathologist 604 and the radiologist 606 record results 632, 634 of the respective pre-operation tests 628, 634 to the EHR. The test results can be protected, such that only the GP 602 and the surgeon 608 can read the results.

The surgeon 608 can take possession of the EHR and can perform an operation 640 on the patient. A surgeon's report 642 can be generated by the surgeon 608. In some examples, the surgeon's report 642 can include information such as the type of operation performed, notes regarding the operation and the like. The surgeon 608 can add the surgeon's report to the EHR, such that only the GP 602 can read the surgeon's report. Consequently, the surgeon's report is protected as read only for the GP 608 and as not accessible by others.

In the depicted example, a pathology request 644 and a radiology request 646 are included in the patient's EHR. In some examples, the requests 644, 646 can be added by the GP 602 during the initial consultation 620. In some examples, the requests 644, 646 can be added by the surgeon 602 after the operation 640. The patient undergoes respective post-operation tests 648, 650 after the operation is performed. In some examples, it can be provided that the patient need not visit the same pathologist 604 or radiologist 606 as previously. In some examples, respective results 652, 654 of the post-operation tests 648, 650 are added to the EHR and can be protected such that only the GP 602 can read the results 648, 650. In the depicted example, the patient returns to the GP 602 for a follow-up consultation 660. In some examples, during the follow-up consultation, the GP 602 reviews the surgeon's report 642 as well as the pre-operation test results 632,634 and the post-operation test results 652, 654. In some examples, a role constraint can be provided, such that the GP 602 who provided the initial consultation 620 must be the same GP providing the follow-up consultation 660.

In some examples, a central authority (not shown) can be provided and can act as the data owner of the EHR of the patient. In such examples, the central authority can define the ACPs applied to the EHR and the GP 602, the pathologist 604, the radiologist 606 and the surgeon 608 can each be authenticated users. In some examples, a template can be provided to define how the EHR is structured (e.g., to state pre-defined structures for referrals, results, reports, etc. together with associated ACPs). Throughout the example workflow scenario 600, an authenticated user (e.g., the GP 600) can add a new "referral" data item to the EHR and can populate the data item with data. In some examples, rules in an ACP can be specified on a generic level (e.g., a particular rule applies to all GP referral data items, as opposed to individualized rules specific to each GP referral data item). In some examples, an authenticated user can send a request to the data owner (e.g., the central authority) to set customized ACPs for particular data items.

Figure 7:
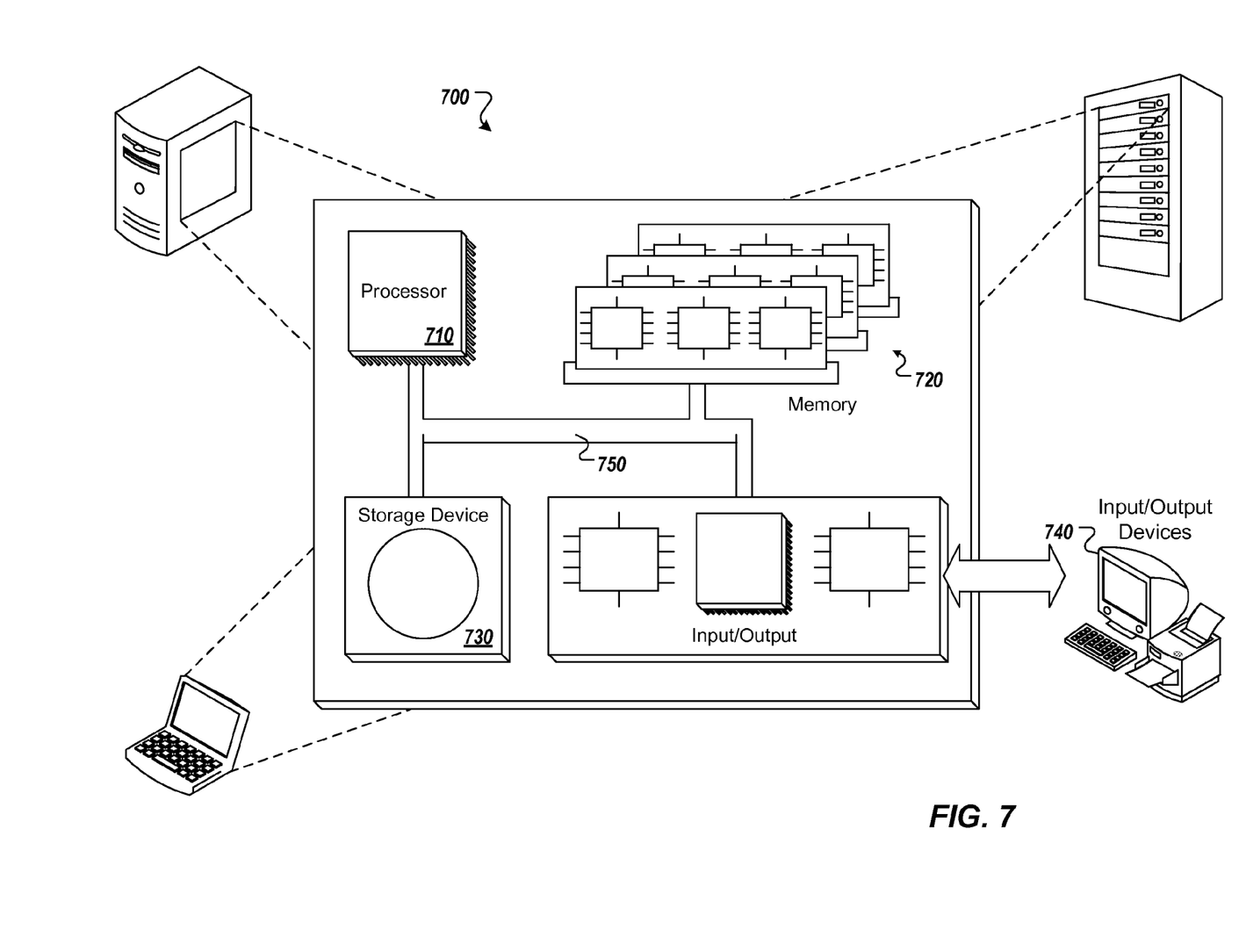
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for controlling access to a workflow object, the method being executed using one or more processors and comprising:

receiving, from a computing device used by an authenticated user, a validation request, the validation request comprising a first hash value and a first validation token, the first hash value being generated based on restricted content of a workflow object comprising a document assigned to a pre-defined workflow spanning through a plurality of domains, and the first validation token indicating a validity of the workflow object and being associated with a first state of a plurality of states of the workflow object, the plurality of the states denoting an evolution of the workflow object; and determining that the authenticated user is authorized to request validation of the workflow object and, in response:

decrypting the validation token to provide a second hash value; and determining that the second hash value is equal to both the first hash value and a third hash value and, in response, transmitting a validation response to the computing device, the validation response indicating that the workflow object is valid.

2. The method of claim 1, wherein determining that the authenticated user is authorized to request validation of the workflow object comprises checking a validation policy.

3. The method of claim 1, wherein decrypting the validation token to provide the second hash value is achieved using a master key associated with the workflow object.

4. The method of claim 1, wherein a validation agent that is executed using the one or more processors receives the validation request and determines that the authenticated user is authorized to request validation of the workflow object.

5. The method of claim 1, wherein the validation agent transmits the validation response to a trusted agent that is executed on the computing device.

6. The method of claim 1, further comprising:
receiving an access key request from the computing device; and
determining, based on one or more access control policies (ACPs) and information provided in the access key request, that the authenticated user is authorized to access one or more data items of the restricted content and, in response:
identifying a set of permitted operations comprising one or more operations that the authenticated user is permitted to perform on the one or more data items;
retrieving, from computer-readable memory, one or more access keys that are usable to access the one or more data items; and
transmitting an access key response to the computing device, the access key response comprising the set of permitted operations and the one or more access keys.

7. The method of claim 6, wherein the information provided in the access key request comprises one or more data item identifiers, each data item identifier corresponding to a data item of the one or more data items.

8. The method of claim 7, wherein identifying a set of permitted operations comprises identifying a permitted operation from the one or more ACPs based on a data item identifier and adding the permitted operation to the set of permitted operations.

9. The method of claim 8, wherein identifying the permitted operation is further based on an identity of the authenticated user.

10. The method of claim 6, wherein an access control agent that is executed using the one or more processors receives the access request and determines that the authenticated user is authorized to access the one or more data items.

11. The method of claim 10, wherein the access control agent transmits the access key response to a trusted agent that is executed on the computing device.

12. The method of claim 1, further comprising:
receiving a validation token request, the validation token request comprising a third hash value, the third hash value being generated based on the restricted content;
recording the third hash value in a state change log, the third hash value corresponding to a second state of the workflow object, the state change log being stored in computer-readable memory;
generating, using the one or more processors, a second validation token based on the third hash value; and
transmitting a validation token response to the computing device used by the authenticated user, the validation token response comprising the second validation token.

13. The method of claim 12, wherein the second validation token is generated based on the third hash value and a master key associated with the workflow object.

14. The method of claim 12, wherein the third hash value is generated based on the restricted content associated with the workflow object.

15. The method of claim 12, wherein the computing device replaces the first validation token with the second validation token.

16. The method of claim 12, wherein, prior to transmitting the validation token request, the computing device:
determines that changes to a working copy of the workflow object conform to one or more permitted operations;
commits the changes to a persistent copy of the workflow object;
calculates the third hash value; and
generates the validation token request.

17. The method of claim 16, wherein a trusted agent that is executed on the computing device determines that the changes conform to the one or more permitted operations, commits the changes, calculates the third hash value, and generates the validation token request.

18. A non-transitory computer-readable storage medium coupled to one or more processors and having instructions stored thereon which, when executed by the one or more processors, cause the one or more processors to perform operations for controlling access to a workflow object, the operations comprising:
receiving, from a computing device used by an authenticated user, a validation request, the validation request comprising a first hash value and a first validation token, the first hash value being generated based on restricted content of a workflow object comprising a document assigned to a pre-defined workflow spanning through a plurality of domains, and the first validation token indicating a validity of the workflow object and being associated with a first state of a plurality of states of the workflow object, the plurality of the states denoting an evolution of the workflow object; and
determining that the authenticated user is authorized to request validation of the workflow object and, in response:
decrypting the validation token to provide a second hash value; and
determining that the second hash value is equal to both the first hash value and a third hash value and, in response, transmitting a validation response to the computing device, the validation response indicating that the workflow object is valid.

19. A system, comprising:
a computing device; and
a non-transitory computer-readable storage device coupled to the computing device and having instructions stored thereon which, when executed by the computing device, cause the computing device to perform operations for controlling access to a workflow object, the operations comprising:
receiving, from a remote computing device used by an authenticated user, a validation request, the validation request comprising a first hash value and a first validation token, the first hash value being generated based on restricted content of a workflow object comprising a document assigned to a pre-defined workflow spanning through a plurality of domains, and the first validation token indicating a validity of the workflow object and being associated with a first state of a plurality of states of the workflow object, the plurality of the states denoting an evolution of the workflow object; and
determining that the authenticated user is authorized to request validation of the workflow object and, in response:
decrypting the validation token to provide a second hash value; and
determining that the second hash value is equal to both the first hash value and a third hash value and, in response, transmitting a validation response to the remote computing device, the validation response indicating that the workflow object is valid.

\* \* \* \* \*